(12) United States Patent
Cheng et al.

(10) Patent No.: US 9,183,281 B2
(45) Date of Patent: *Nov. 10, 2015

(54) CONTEXT-BASED DOCUMENT UNIT RECOMMENDATION FOR SENSEMAKING TASKS

(75) Inventors: Wen-Huang Cheng, Xindian (TW); David Haim Gotz, Purdys, NY (US)

(73) Assignee: International Business Machines Corporation, Armonk, NY (US)

(*) Notice: Subject to any disclaimer, the term of this patent is extended or adjusted under 35 U.S.C. 154(b) by 1283 days.

This patent is subject to a terminal disclaimer.

(21) Appl. No.: 12/105,759

(22) Filed: Apr. 18, 2008

(65) Prior Publication Data

US 2009/0265330 A1 Oct. 22, 2009

(51) Int. Cl.
*G06F 17/30* (2006.01)

(52) U.S. Cl.
CPC .............................. *G06F 17/30699* (2013.01)

(58) Field of Classification Search
None
See application file for complete search history.

(56) References Cited

U.S. PATENT DOCUMENTS

| | | | |
|---|---|---|---|
| 5,754,939 A * | 5/1998 | Herz et al. | 455/3.04 |
| 6,460,036 B1 * | 10/2002 | Herz | 707/748 |
| 6,968,332 B1 | 11/2005 | Milic-Frayling et al. | |
| 7,089,237 B2 | 8/2006 | Turnbull et al. | |
| 7,228,507 B2 | 6/2007 | Good et al. | |
| 7,315,848 B2 | 1/2008 | Pearse et al. | |
| 2001/0049684 A1 | 12/2001 | Light et al. | |
| 2005/0028108 A1 | 2/2005 | Baudisch et al. | |
| 2005/0171946 A1 | 8/2005 | Maim | |
| 2005/0222973 A1 | 10/2005 | Kaiser | |
| 2007/0150470 A1 * | 6/2007 | Brave et al. | 707/6 |
| 2007/0300190 A1 | 12/2007 | Bier et al. | |
| 2009/0110268 A1 * | 4/2009 | Dejean et al. | 382/159 |

OTHER PUBLICATIONS

Paul E. Black and Paul J. Tanenbaum, "graph", in Dictionary of Algorithms and Data Structures [online], Paul E. Black, ed., U.S. National Institute of Standards and Technology. Sep. 27, 2010. (accessed Today) Available from: http://xw2k.nist.gov/dads/HTML/graph.html.*

Paul E. Black, "directed acyclic graph", in Dictionary of Algorithms and Data Structures [online], Paul E. Black, ed., U.S. National Institute of Standards and Technology. Apr. 19, 2004. (accessed Today) Available from: http://xw2k.nist.gov/dads/HTML/directAcycGraph.html.*

(Continued)

*Primary Examiner* — Jason Liao
(74) *Attorney, Agent, or Firm* — Nidhi Garg; Ryan, Mason & Lewis, LLP (57) ABSTRACT

Techniques for locating information in a document relevant to an interest of a user are provided. Information defined by the user of a document browser is collected. A context model is generated using the collected information. A document selected by the user is obtained. The document is divided into one or more segments. A relevance value is computed for each of the one or more segments by comparing each of the one or more segments to the context model. The relevance value represents a relationship to an interest of the user. Each of the one or more segments with the computed relevance value is presented in a defined organizational area of a display. The one or more segments presented on the display are linked to a corresponding one or more segments in the document.

21 Claims, 8 Drawing Sheets

(56) References Cited

OTHER PUBLICATIONS

C. Olston et al., "ScentTrails: Integrating Browsing and Searching on the Web," ACM-Transaction, http://www.cs.cmu.edu/~olston/publications/scenttrails.pdf, Sep. 2003, pp. 1-21, vol. 10, No. 3.

J. Mahmud et al., "CSurf: A Context-Driven Non-Visual Web-Browser," WWW 2007, Track: Browers and User Interfaces, http://www2007.org/papers/paper649.pdf, pp. 31-40, Canada.

David Gotz, "The ScratchPad: Sensemaking Support for the Web," http://www2007.org/posters/poster998.pdf, WWW 2007, Poster Paper, May 2007, pp. 1329-1330, Canada.

G. Hattori et al., "Robust Web Page Segmentation for Mobile Terminal Using Content-Distances and Page Layout Information," Proc. of WWW International Conference Committee, May 2007, pp. 361-370, Canada.

I. Dagan et al., "Contextual Word Similarity and Estimation from Sparse Data," Computer Speech and Language, Feb. 1995, pp. 1-37, vol. 9.

M.C. Schraefel et al., "Hunter Gatherer: Interaction Support for the Creation and Management of Within-Web-Page Collections," Proc. of Inter. WWW Conference, May 2002, pp. 172-181, Hawaii.

Y. Yang et al., "A Comparative Study on Feature Selection in Text Categorization," Proc. of the International Conference on Machine Learning, 1997, pp. 1-9.

U.S. Appl. No. 11/780,567 filed in the name of D. Gotz on Jul. 20, 2007 and entitled "Methods for Organizing Information Accessed Through a Web Browser."

P. Ferragina et al., "A Personalized Search Engine Based on Web-Snippet Hierarchical Clustering," In Inter. WWW Conf., May 2005, 10 pages, Japan.

D. Gotz et al., "Interactive Visual Synthesis of Analytic Knowledge," In IEEE Symposium on Visual Analytics Science and Technology (VAST), Nov. 2006, pp. 51-58, Maryland.

R. Kraft et al., "Searching with Context," In Inter. WWW Conf., May 2006. 10 pages, Scotland.

G. Rossi et al., "Designing Personalized Web Applications," In Inter. WWW Conf., May 2001, pp. 275-284, Hong Kong.

W. Wright et al., "The Sandbox for Analysis—Concepts and Methods," In ACM CHI, 2006, pp. 1-10.

Y.B. Shrinivasan et al., "Supporting the Analytical Reasoning Process in Information Visualization," ACM Human Factors in Computing Systems (CHI), Apr. 2008, 10 pages, Italy.

N. Jhaveri et al., "The Advantages of a Cross-Session Web Workspace," In CHI Extended Abstracts, CHI 2005, Apr. 2004, 4 pages, Oregon.

R. Baeza-Yates et al., "Modern Information Retrieval," ACM Press, Jan. 1999, 38 pages.

J.J. Jiang et al., "Semantic Similarity Based on Corpus Statistics and Lexical Taxonomy," Procs. of the International Conference on Research on Computational Linguistics, (ROCLING X), Aug. 1997, 15 pages, Taiwan.

T. Pedersen et al., "Wordnet: Similarity-Measuring the Relatedness of Concepts," Human Language Technology Conference, May 2004, 4 pages.

* cited by examiner

| VARIABLE | DESCRIPTION |
|---|---|
| $C$ | A CONTEXT MODEL |
| $N_C$ <br> $n_i$ <br> TYPE $\{n_i\}$ <br> ID $\{n_i\}$ <br> PAYLOAD $\{n_i\}$ <br> CONTENT $\{n_i\}$ | THE SET OF NODES IN $C$ <br> AN INDIVIDUAL NODE IN THE SET $N_C$ <br> THE TYPE OF NODE $n_i$ <br> THE IDENTIFIER OF NODE $n_i$ <br> THE RAW DATA ASSIGNED TO NODE $n_i$ <br> THE EXTRACTED CONTENT ASSIGNED TO NODE $n_i$ |
| $E_C$ <br> $e_i$ <br> NODES $\{e_i\}$ | THE SET OF EDGES IN $C$ <br> AN INDIVIDUAL EDGE IN THE SET $E_C$ <br> THE SET OF NODES CONNECTED BY EDGE $e_i$ |

| | Score | Recommended Section |
|---|---|---|
| | 2.068 | Boston Attractions and Dining ...Bo.... |
| | 1.858 | View all Boston hotels... View all B... |
| | 1.660 | Boston...Boston Vacation Packages... |
| | 1.584 | Deals on ..Boston Hotels |
| | 1.402 | Boston highlights to go!...Boston hi... |
| | 1.345 | Boston Hotel Recommendations...Bo... |
| | 1.304 | Nearby Cities ...Brookline |
| | 1.261 | Home...> Boston Tourism |
| | 1.122 | Boston Vacations – Boston Tourism |
| | 0.935 | Boston Recent Traveler Reviews..... |
| | 0.935 | Find a great Boston hotel deal! Sma.. |
| | 0.935 | Boston Traveler Form... Boston Tr.... |
| | 0.918 | Top Boston Attractions: ...View all... |
| | 0.843 | Search ...(e.g, Boston hotels, Las V... |

Boston Attractions and Dining

Top Boston Attractions:
1. Freedom Trail
2. Boston Duck Tours
3. Faneuil Hall Marketplace
4. North End
5. USS Constitution (Old Ironsides)
6. Fenway Park
7. Boston Children's Museum
8. Isbella Stewart Gardner Museum
9. Boston Public Garden
10. Museum of Fine Arts ▷ View all Boston attractions Boston Articles and Guidebooks

*FIG. 8*

CONTEXT-BASED DOCUMENT UNIT RECOMMENDATION FOR SENSEMAKING TASKS

FIELD OF THE INVENTION

The present invention relates to document browsers and, more particularly, to techniques for assisting users in sensemaking while using document browser applications.

BACKGROUND OF THE INVENTION

Technological improvements continue to revolutionize how people use the web to perform daily tasks. Specifically, many of these improvements deal with how we search and retrieve information. One common example of search and retrieval is the act of obtaining a list of documents most relevant to a specific task by typing in a set of keywords in a search engine. Search and retrieval is effective for many straightforward tasks (e.g., finding a movie title, finding a document, find a phone number, locating goods for purchasing, etc.). However, in many instances, users carry out information tasks that are much more complex.

Search engines are designed to assist users during the very first stage of research in which a user must locate a relevant document. Beyond the first stage, search engines have limited analysis value because they do not help users locate relevant information within a document. More complex tasks often require people to examine many different documents and threads of logic. Users must connect pieces of information collected across different threads and develop combined insights that are more valuable than lone bits of information. This process may be referred to as "connecting the dots" and is the essence of sensemaking.

Sensemaking involves making sense out of distant nuggets of information that must be identified and gathered from several different sources. Sensemaking tasks are typically longer running and more complex than information seeking tasks because they require users to address open-ended questions for which answers cannot be found on any single document. As a result, users must collect fragments of information from multiple sources and discover connections between them to build a coherent solution for a particular task. The process of "connecting the dots" is a difficult challenge in which users must mentally compare the content from a document they are viewing with the set of information they have already collected during previous stages of their task.

Currently available technologies provide only limited support for sensemaking. For example, several browser-based tools have been proposed that support the collection and organization of information (e.g., bookmarks, photos, fragments of text, etc.). Google Notebook, http://www.google-.com/notebook/; N. Jhaveri et al., "The advantages of a cross-session web workspace," in CHI '05: CHI '05 extended abstracts on Human factors in computing systems, pp. 1949-1952, New York, N.Y., USA, 2005, ACM Press; Clipmarks, http://www.clipmarks.com/; and M. C. Schraefel et al., "Hunter gatherer: Interaction support for the creation and management of within-web-page collections," In Proc. of Inter. WWW Conf., 2002. These tools have proven useful for organizing and revisiting fragments of information found during a sensemaking task, however, these tools do not address the more difficult aspect of sensemaking, which is the need to "connect the dots" between the fragments of content on a newly viewed document with information previously collected by the user. This process is still manually performed in the post-search phase after a user arrives at a particular document. A user must still read through all of the potentially relevant content on a document to find any scattered fragments of information which may be relevant to their ongoing task.

SUMMARY OF THE INVENTION

Principles of the present invention provide techniques that overcome the above-mentioned drawbacks associated with existing methods by providing techniques that address the above needs, as well as other needs. More particularly, principles of the invention provide techniques for locating information in a document relevant to an interest of a user. Further, the proposed techniques provide an environment which may be coupled to existing document viewing applications and technologies.

For example, in one embodiment of the invention, a technique for locating information in a document relevant to an interest of a user is provided. Information defined by the user of a document browser is collected. A context model is generated using the collected information. A document selected by the user is obtained. The document is divided into one or more segments. A relevance value is computed for each of the one or more segments by comparing each of the one or more segments to the context model. The relevance value represents a relationship to an interest of the user. Each of the one or more segments with the computed relevance value is presented in a defined organizational area of a display. The one or more segments presented on the display are linked to a corresponding one or more segments in the document.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIGS. 7A and 7B are screenshots showing a ranked list of relevant document segments and a segment of a document corresponding to the first item on the ranked list, respectively, according to an embodiment of the present invention.

DETAILED DESCRIPTION OF PREFERRED EMBODIMENTS

The present invention will be described in conjunction with exemplary methods for locating information in a document relevant to an interest of a user, more specifically, assisting a user in sensemaking tasks by locating information in a web document using a generated context model. It should be understood, however, that the invention is not limited to the particular embodiments described herein. The principles of this invention are generally applicable to locating relevant information in any type of document, not only web documents or web pages. Further, the proposed techniques may be applied to any document browser, not only to web browsers. It should also be appreciated that the present techniques may be practiced together with the general sensemaking tool disclosed in U.S. application Ser. No. 11/780,567, entitled "Methods for Organizing Information Accessed Through a Web Browser," filed on Jul. 20, 2007, the disclosure of which is incorporated by reference herein. Modifications to the illustrative embodiments will become apparent to those skilled in the art given the teachings described herein.

The term "document" as used herein is intended to be construed broadly so as to encompass, by way of example and without limitation, any body of information that may be presented through the use of text, graphics, charts, and/or any other objects.

The term "document browser" as used herein is intended to be construed broadly so as to encompass, by way of example and without limitation, any application used to view and browse through a document. Examples of document browsers include, but are not limited to, Adobe Acrobat® (a registered trademark of Adobe Systems), Internet Explorer® (a registered trademark of Microsoft Corporation), and Mozilla FireFox® (a registered trademark of Mozilla Foundation).

The following proposed invention aims to meet the following requirements: (i) Site Independence—A sensemaking tool should be independent of any specific site or content provider. No single service can host every piece of information relevant to a sufficiently complex sensemaking task, therefore, any tool designed to support sensemaking should work across all web sites; (ii) Note-Taking Functionality—A sensemaking tool should allow for the collection of information fragments into a task-specific workspace. For example, a user preparing to move to a new town should be able to record hospital locations, school rankings, and other relocation information within a workspace dedicated to their task; and (iii) Assistance in Connection Discovery—A sensemaking tool should assist the user in performing the most difficult stage of their task, which is uncovering connections between their notes and what is currently being explored in their document browser.

The proposed invention will be illustrated in conjunction with a sensemaking tool, referred to herein as a "context tool." In an exemplary embodiment, the context tool may be an extension of a traditional browser interface. The context tool assists in connection discovery during sensemaking tasks by providing the user with context-based document unit recommendations. In one embodiment, the context tool allows users to capture information they find while researching a particular topic within a notebook-like sidebar. The captured information may be re-accessed by the user (e.g., as with traditional bookmarks). Further, the captured information may be used to generate a context model. In one embodiment of the present invention, the context model may be a data structure, which represents one or more interests of the user (e.g., sensemaking topics). The model may then be used to facilitate real-time recommendations of relevant document units during the user's future browsing activity.

Figure 1:
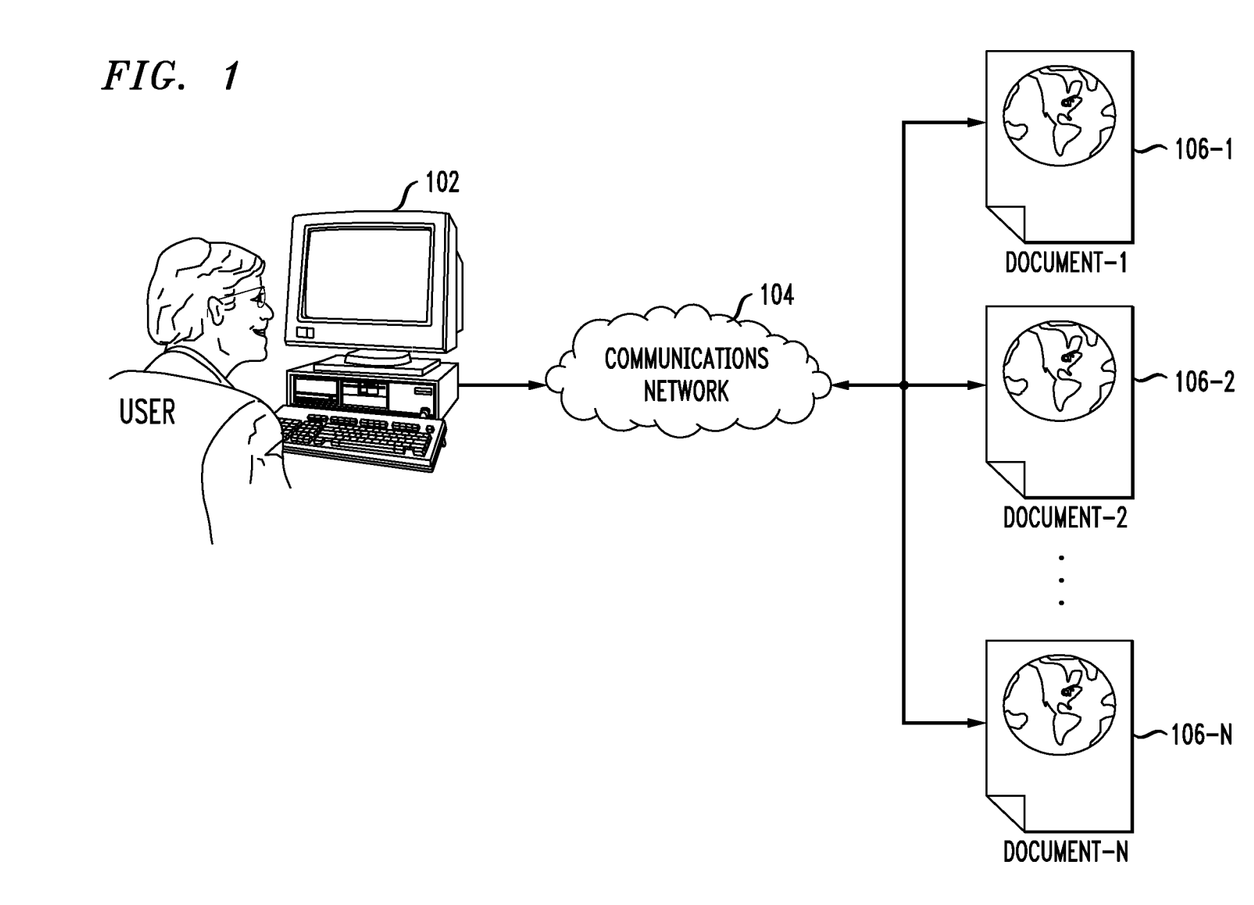
FIG. 1 is a diagram illustrating one general implementation for employing the proposed techniques, according to an embodiment of the present invention.

Referring initially to FIG. 1, a diagram illustrates one general implementation for employing the proposed techniques, according to an embodiment of the present invention. A user 102 is connected to a communications network 104 via a computer-based terminal. The communications network 104 connects the user 102 to one or more networked servers that comprise one or more documents (106-1, ... 106-N). It is to be appreciated that the one or more documents may also be contained directly in the computer-based terminal.

In an exemplary embodiment, the computer-based terminal comprises a document browser (e.g., a web browser or document viewer), which allows the user 104 to view the documents (106-1, ... 106-N). In an additional embodiment, a context tool operates concurrently with the document browser. The context tool has two primary functions. First, similar to other note-taking tools, the context tool allows a user to store, organize, and display notes which are collected during a sensemaking task. In addition, the context tool uniquely exploits the stored knowledge captured by the user as part of their natural note-taking behavior, to provide context-based document unit recommendations. The document unit recommendations highlight content relevant to the sensemaking task of the user in documents subsequently viewed by the user. As applied to FIG. 1, the context tool allows the user to collect information related to a task or interest as the user views documents (106-1, ... 106-N). Using the collected information, the context tool locates information on subsequently viewed documents related to the user's task or interest.

Figure 2:
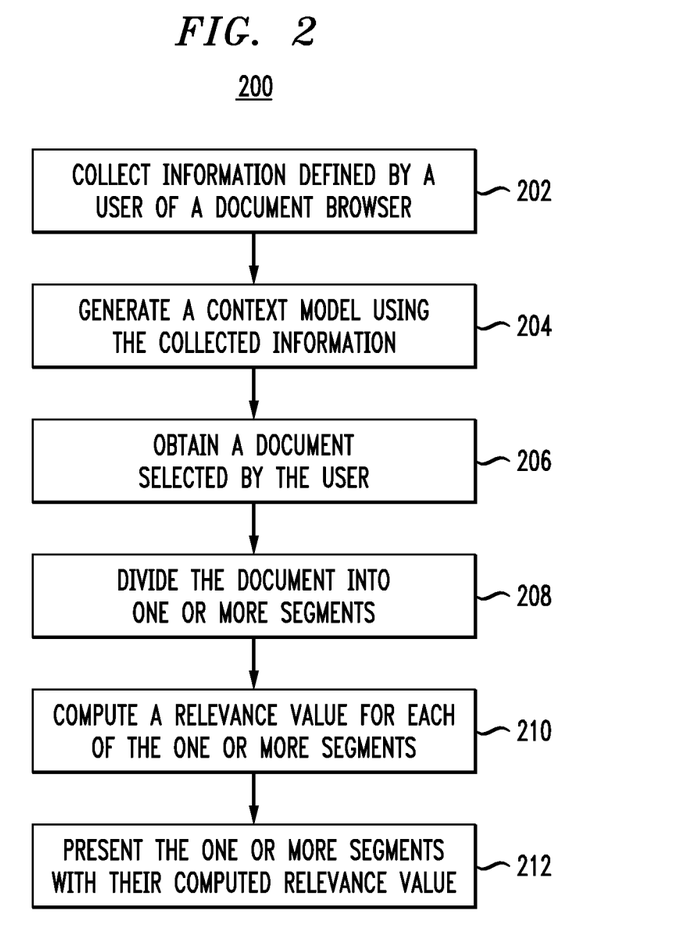
FIG. 2 is a flow diagram illustrating a methodology for locating information in a document relevant to an interest of a user, according to an embodiment of the present invention.

Referring now to FIG. 2, a flow diagram illustrates a methodology for locating information in a document relevant to an interest of a user, according to an embodiment of the present invention. In an exemplary embodiment, the context tool carries out the steps of methodology 200. Methodology 200 begins at step 202 where information defined by a user of a document browser is collected. Information defined by the user may comprise a portion of text from a previously viewed document, an image from a previously viewed document, a web address, and/or a note inputted by the user. It is to be appreciated that information defined by the user may include any other pieces of data relevant to a sensemaking task of the user. In an exemplary embodiment, a user carrying out a research task may highlight and drag text and images into the context tool as he or she browses multiple documents (see FIG. 4). The user may also type in notes into the context tool to further document his or her research task.

At step 204, a context model is generated using the collected information. The context model is a data structure used to represent a task or interest of a user. The model may comprise explicit information from the user (e.g., information collected from previously viewed documents) and/or inferred information about an interest of the user (e.g., the model may make logical factual connections between the pieces of collected information). The context model is the basis for assisting the user in locating relevant pieces of information in subsequently viewed documents. In an additional embodiment, the context model is updated as additional information is collected from the user. The context model will be described in greater detail below with reference to FIG. 5.

After a context model is generated, a document selected by the user is obtained (step 206). In an exemplary embodiment, the selected document is a new document never previously viewed by the user. At step 208, the document is divided into one or more segments. The document may be divided in accordance with structural tags of the document (e.g., HTML tags) and/or text of the document (e.g., titles, sub-titles, sentences, links, lone words, pages, etc.).

Using the generated context model, a relevance value is calculated for each of the one or more segments (step 210). The relevance value represents how relevant a document segment is to the information previously collected by the user. The relevance value for each of the one or more segments may be re-evaluated anytime the context model is updated or when the document is revisited.

At step 212, the one or more segments with their computed relevance values are presented to the user. The segments may be presented in the order of relevance, alphabetical order, or in order of appearance in the document. The user may then select a segment and view it in context within the document browser. In an exemplary embodiment, the context tool navigates the document browser to the one or more segments requested by the user. This may include scrolling and/or paging to the one or more segments in the document. After a segment is located, the segment may be marked in the document by a highlight, a zoom-in, a thumbnail, and/or a popup window. Methodology 200 will be described in greater detail below with reference to a system in FIG. 3.

It is to be appreciated that methodology 200 is a static embodiment of the present invention represented in one flow diagram. In practice, however, the steps of methodology 200 may occur in various orders depending on the dynamic situation of a user. For instance, when a user records notes, only steps 202 and 204 are applicable. As a user views a new document, steps 206, 208, 210, and 212 are applicable. Next, if a user collects additional notes, the context model of the user is updated (e.g., a new context model is generated), and new relevance values are computed for the one or more segments of a currently viewed document, in which case, steps 202, 204, 210, and 212 are carried out. The dynamic nature of the present invention is best described as two interactive loops, a context loop and an exploration loop, as will be described below with reference to FIG. 3.

Figure 3:
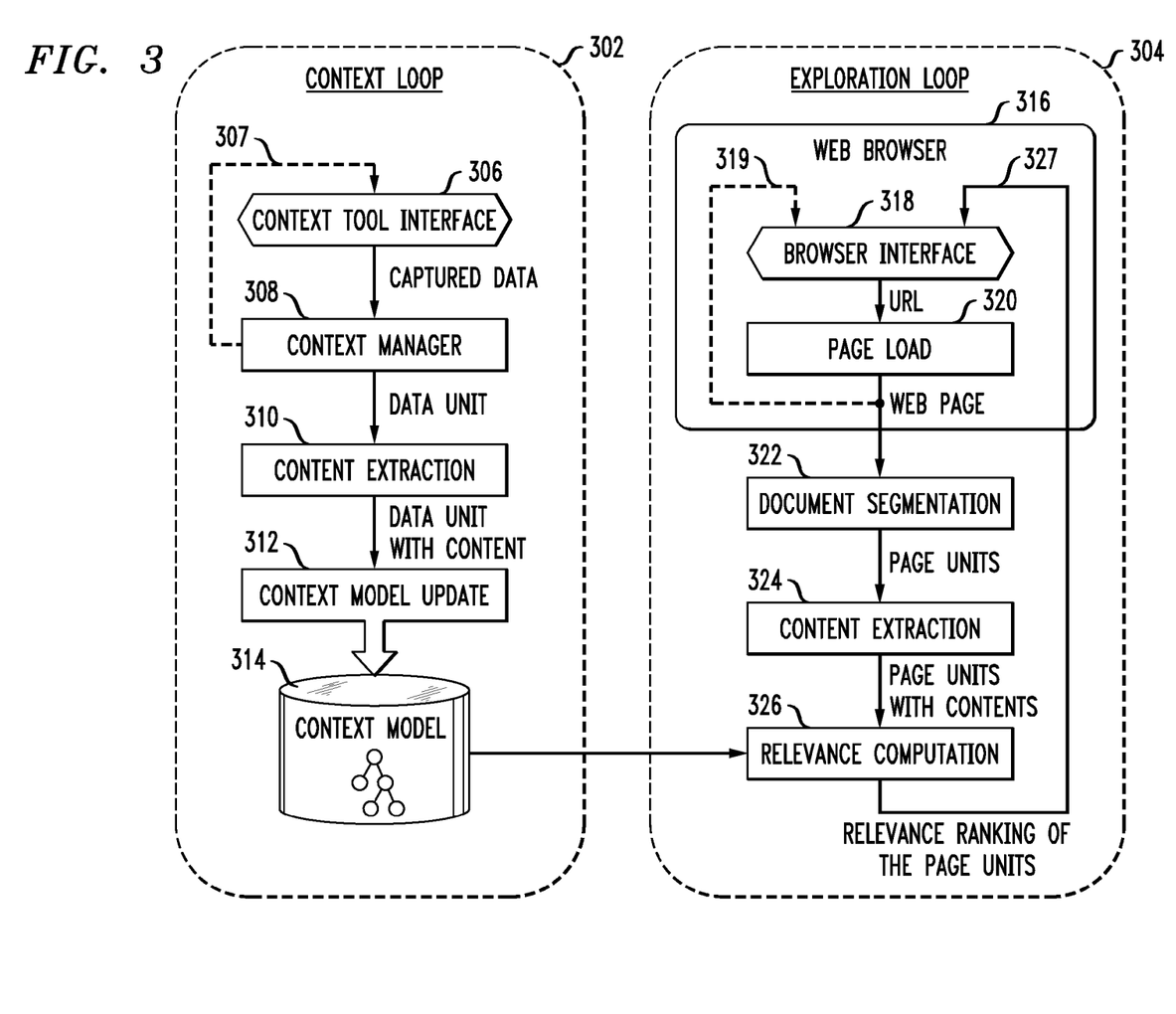
FIG. 3 is a system carrying out the steps of the methodology in FIG. 2, according to an embodiment of the present invention.

In FIG. 3, a system carries out the steps of methodology 200 in FIG. 2, according to an embodiment of the present invention. In an exemplary embodiment, the context tool may be displayed in a re-sizable vertical sidebar located adjacent to a main browser display area (see 606 in FIG. 6). The context tool architecture may be illustrated as two interaction loops (302 and 304) as shown in FIG. 3. The context loop 302 is executed when a user records new information, and the exploration loop 304 occurs as the user browses documents. At the conclusion of both loops, the context tool provides a ranked list of recommended document fragments based on the user's notes and the content of a currently displayed document.

The context loop 302 incorporates steps 202, 204, 210, and 212 of methodology 200, and is triggered when a user interacts with a context tool interface 306. The context tool interface 306 provides tools for users to record and/or organize their notes. Context tool interface 306 carries out step 202 of methodology 200 (e.g., collecting information defined by a user of a document browser). As the user collects notes from browsed documents (e.g., capturing data), a context manager 308 processes the captured data in the background. The context manager 308 is responsible for coordinating the real-time interaction process whenever a user enters the context loop 302.

Figure 4:
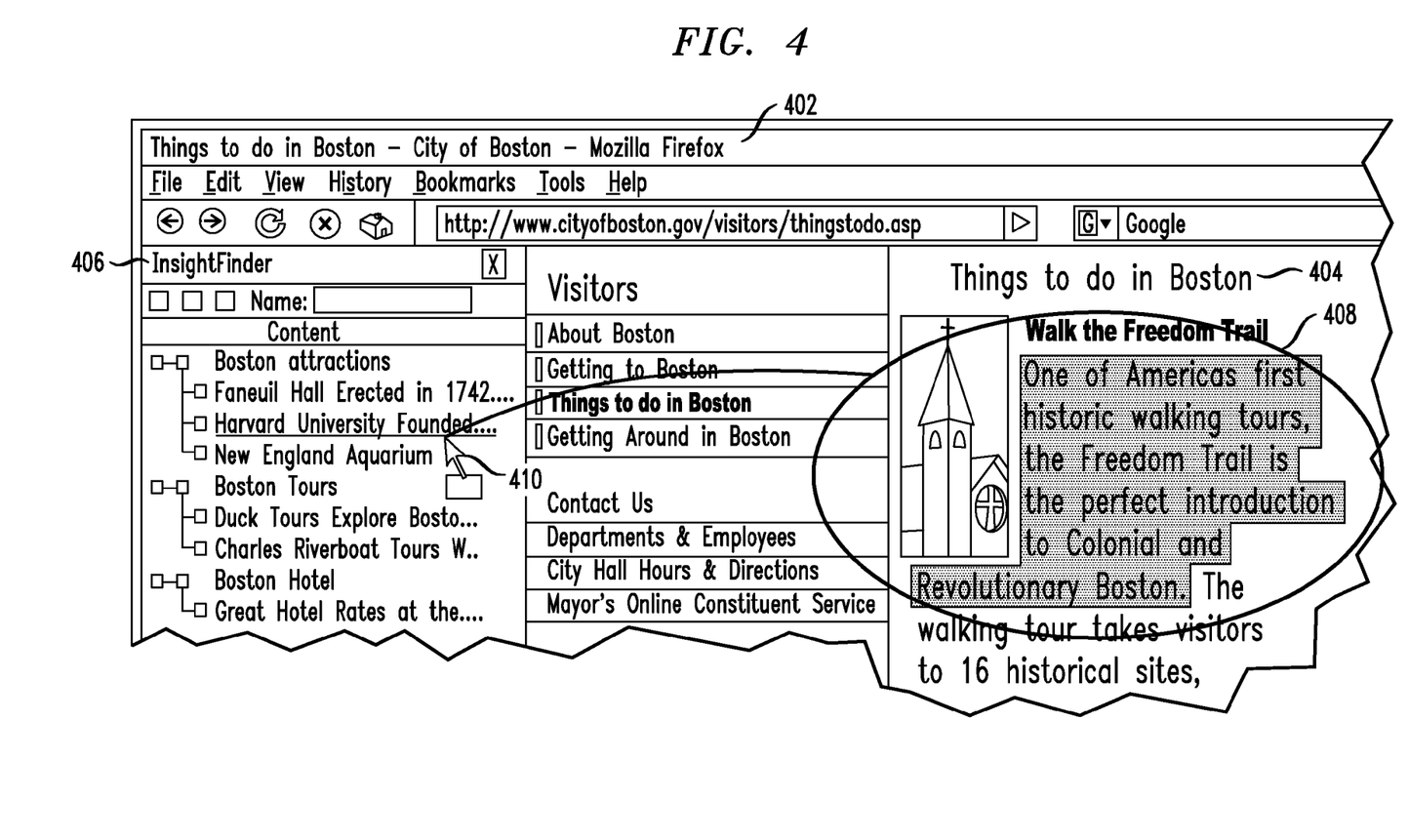
FIG. 4 is a screenshot illustrating the capturing of relevant information from a document and storing it in a context note-taking area, according to an embodiment of the present invention.

As a user captures data from a document into their notes, the context manager 308 updates (flow 307) a tabular presentation used to display the user's notes within the context tool interface 306 (see FIG. 4). At the same time, the context manager 308 forwards the captured data to a content extraction module 310, described below, for further processing. The context manager 308 may also monitors for other user behavior, such as note reorganization (e.g., users may add new items, delete or modify existing items, or reorganize them into different folder structures) to ensure that the displayed set of notes is synchronized with the data stored within the context tool system.

The content extraction module 310 of the context loop 302 is responsible for extracting content (e.g., primary concepts or ideas) from a data unit of the captured data. A data unit may be defined as a document fragment, ranging from a single word to an entire page. Data units in the context loop 302 are called context units because they correspond to fragments of information from the user's notes. The extracted content is represented as a bag-of-words containing a set of meaningful terms selected from the original text contained within the data unit. Currently, a simple unigram algorithm is applied to generate the term set. R. Baeza-Yates et al., "Modern Information Retrieval," Addison Wesley, Boston, Mass., 1999, the disclosure of which is incorporated by reference herein. In this algorithm, raw textual data is cleaned by removing stopwords. Then, the remaining terms are collected to form the final content term set. In the future, we plan to expand this to an n-gram term extraction.

The extracted content from the content extraction module 310 is then processed by a context model update module 312. The context model update module 312 carries out step 204 of methodology 200 (e.g., generating a context model using collected information). Module 312 is responsible for integrating the content extracted from the captured data into the context model data structure 314. The context model 314, described below with reference to FIG. 5, may be a graph-based data representation. The context model update module 312 may create, modify, or remove context data from the context model 314 as required by the user's interaction with his or her notes. Anytime the context model 314 is updated, a relevance computation module 327, carrying out steps 210 and 212 of methodology 200, may update relevance values on any currently viewed document.

Exploration loop 304 incorporates steps 206, 208, 210, and 212 of methodology 200, and occurs when a user interacts with a normal document browser 316 (e.g., a web browser). In one embodiment, the document browser 316 comprises a browser interface 318 in which users can view documents. The browser interface 318 is used to carry out step 206 of methodology 200 (e.g., obtaining a document selected by the user). When a user selects a document to be viewed, the document is loaded 320 and presented to the user on the browser interface 318 (flow 319). Concurrently, the document is forwarded to a document segmentation module 322 for further processing.

Whenever a user navigates to a new document (e.g., web page), the document segmentation module 322 begins to process the content of the document in a background process. The document segmentation module 322 carries out step 208 of methodology 200 (e.g., dividing a document into one or more segments). This module analyzes the structure of a document and partitions it into a set of smaller fragments called document units (e.g., segments). Since the context tool is designed to help users quickly locate information within a document by recommending task-relevant document units, the goal is to isolate individual content units which contain semantically consistent data (e.g., all information in the unit should share a common topic).

A structure-based algorithm may be employed to carry out segmentation. G. Hattori et al., "Robust web page segmentation for mobile terminal using content-distances and page layout information," In Proc. of WWW Conf., pp. 361-370, May 2007, the disclosure of which is incorporated by reference herein. The algorithm utilizes HTML tag distance to determine document unit boundaries by analyzing a document's document object model (DOM) tree, a structural representation used internally by most popular browsers. In one illustrative embodiment, we utilize the TREEWALKER DOM object to extract a document's HTML tag hierarchy. Each document unit is defined using a pair of DOM indices to represent the start and the end positions of the unit within the DOM tree.

The indices may also be used in the visual presentation of recommendations to the user. In one exemplary embodiment, when users click on items in the context tool's list of recommended document units (see 610 in FIG. 6), the indices are used to determine the DOM subtree, which corresponds to the selected document unit. The subtree's visual style may then be modified to perform dynamic highlighting of the corresponding portion of the document. In one embodiment, a selected unit in the document is highlighted by drawing a red box around it.

After the segmentation process, the document units, or segments, are forwarded to a content extraction module 324, which functions in the same manner as the content extraction module 310 of the context loop 302. The document units undergo the same cleaning process (see content extraction module 310). However, unlike in the context loop 302 where context units are manually created by a user, document units are automatically obtained by segmenting documents visited by the user.

The document units and the content extracted from the document units are then processed by the relevance computation module 326, which computes a relevance value for each of the document units. As stated above with reference to the context loop 302, the relevance computation module 326 carries out steps 210 and 212 of methodology 200. The module compares the content of the currently displayed document to the system's context model 314, which represents the user's recorded notes. A list of document units is then presented to the user with corresponding relevance metrics (flow 327), which will be described below with reference to FIG. 7.

The relevance computation algorithm is part of both interaction loops. In the context loop 302, changes to the user's notes trigger a context model update 312. In response, the system re-evaluates the relevance computation 326 to provide new document unit recommendations based on the new notes. In the exploration loop 304, the relevance evaluation 327 is performed every time a user visits a new document so that recommendations can be made based on the current set of document units.

The dynamic nature of the relevance algorithm is a critical element of the design of the context system. As users extend and modify their note-based context models in the process of completing a sensemaking task, the relevance value assigned to a particular document unit will change over time to reflect the evolving context in which the users are working. Further, without additional user input, the context tool automatically and dynamically provides context-relevant document unit recommendations to encourage faster identification of relevant content.

Referring now to FIG. 4, a screenshot illustrates the capturing of relevant information from a document and storing it in a context note-taking area, according to an embodiment of the present invention. In an illustrative embodiment, a document browser 402 comprises a document browsing window 404 and a context tool with a note-taking area 406. When collecting information, a user may highlight 408 and drag 410 text related to his or her sensemaking task into the note-taking area 406. The collected information is the basis for generating a context model of the user.

Generally, the context tool allows users to record information at several levels of granularity and provides tools for the creation, manipulation, and removal of captured notes. Underneath the graphical display of the user's collection of notes 406 is a graph-based data structure, called the context model. The context model, described below with reference to FIG. 5, mirrors the visual presentation of notes and augments it with additional information required for the document unit recommendation algorithm.

Figure 5:
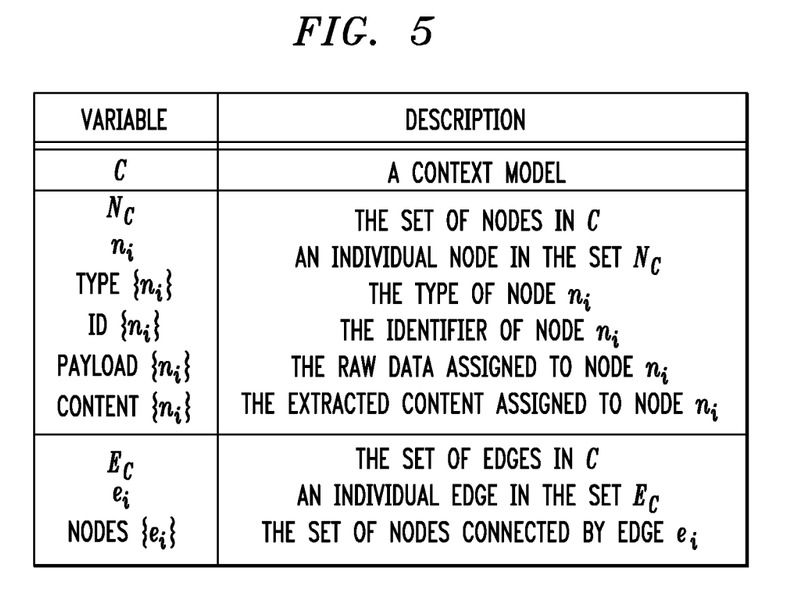
FIG. 5 is a table illustrating a context model notation, according to an embodiment of the present invention.

Referring now to FIG. 5, a table illustrates a context model notation, according to an embodiment of the present invention. In an exemplary embodiment, a context model C is a disconnected graph defined by a set of nodes, $N_C$, and a set of edges, $E_C$. Each node $n_i \in N_C$ corresponds to a data unit explicitly added to the context tool by a user. Similarly, each edge $e_i \in E_C$ corresponds directly to a user-created association between data units. Nodes and edges define the backbone of the context model and all other data is represented as properties of these primary structures.

Context model nodes represent atomic units of information captured by a user within the graph. Each node $n_i$ has several important properties: type, identifier, payload, and content. These properties correspond to either attributes of the information captured by the user, or values computed algorithmically by the context tool.

The type of a node, $Type\{n_i\}$, is initially assigned during the creation of the node and depends upon the type of information being captured. Instead of simply capturing entire documents, the context tool allows users to collect information at a much finer granularity. For example, users can "drag-and-drop" individual links, images, or text fragments from a document into the context tool. Therefore, whenever a drop event is detected, the context tool analyzes the HTML tags of dropped data to automatically determine the type. For complex fragments, the type field may be multi-valued. For example, dragging an image with links from a web page into the context tool will create a node with dual types: image and link. Since the type is a native attribute of the captured data, it is immutable unless the stored data itself is explicitly modified by the user.

Nodes also have a unique identifier, noted as $ID\{n_i\}$, which includes a time stamp of when the node was created. In addition to providing a unique reference for each node, the identifier can be utilized to build a chronological view of the user's activity. As with the type field, identifiers are immutable and cannot be modified.

The payload of a node, noted as $Payload\{n_i\}$, stores the raw content of the captured information. The specific data placed in this field depends upon the type of node. For example, a node with type text will have its $Payload\{n_i\}$ set to a text string, while a node of type image will store the actual image data.

The content of a node, noted as $Content\{n_i\}$, stores the set of terms extracted by the content extraction module 310 as described in FIG. 3. The source of this data depends directly upon the type of node. For example, the content for a node with type text is directly extractable from the payload field. In contrast, the content for a node of type image is populated from the images attribute in the corresponding document if such a value has been assigned.

Context model edges are created when users interactively group fragments in their notes together using folders provided by the context tool. By grouping nodes in folders, users are implying that there is a common idea or concept shared among the grouped nodes. For example, a user groups a set of nodes within a folder named "Sports" to indicate that all of the captured notes are sports-related.

Within the context model, a folder may be represented using a special type of node which is connected by edges to all context nodes placed in the folder by the user. Therefore, an edge may be directional and may express a subsumption relation in which one data unit belongs to a specific folder. The ordered pair of nodes for edge $e_i$ is defined as Nodes$\{e_i\}=\{n_j, n_k\}$ where $n_j, n_k \in N_C$, $n_j$ and $n_k$ are, respectively, a folder and a member node.

The context model is used to represent the notes of a user as captured during a sensemaking task. The context model is built dynamically by the context tool system while a user performs their normal note-taking behavior. When a user begins a new task, the context model is initialized as an empty graph. The graph then grows as the user records information within the context tool interface while browsing documents as shown in FIG. 4.

In addition to adding new information, users may also manipulate and organize existing objects within the context tool to clarify their overall notes as their task evolves. Similar to the creation of new notes, note modifications trigger changes within the context model to ensure that it properly reflects all changes to the notes of the user. For example, when a specific fragment of data is removed from a user's notes, the corresponding context model node and all associated edges will be deleted.

The context tool provides more than basic note-taking capabilities for one sensemaking task. In an additional embodiment, the context tool has the ability to maintain unique multi-session context models for each user task. This is especially critical because multiple sensemaking tasks are often performed over the course of several browsing sessions. Each task-specific context model (e.g., one for "Trip to New York" and another for "Investment Research") may provide topical document unit recommendations.

Figure 6:
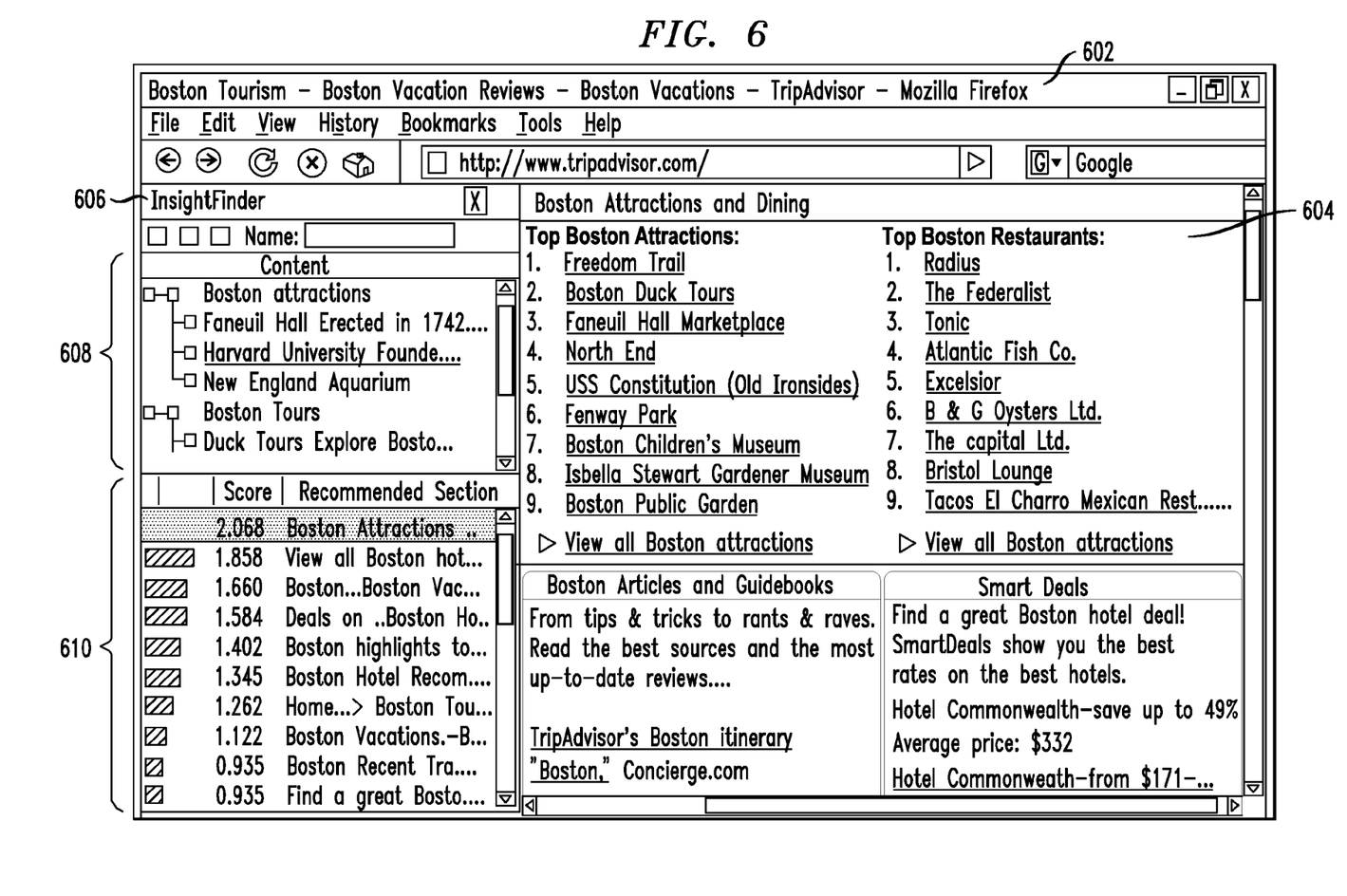
FIG. 6 is a screenshot showing a document browser enhanced with a context note-taking area and a ranked list of relevant document segments, according to an embodiment of the present invention.

Referring now to FIG. 6, a screenshot shows a document browser enhanced with a context note-taking area and a ranked list of relevant document segments, according to an embodiment of the present invention. In an exemplary embodiment, a document browser 602 with a conventional document browsing window 604 is enhanced with a context tool in the form of a notebook-like sidebar 606. The notebook-like sidebar 606 comprises a context note-taking area 608, and a ranked list of relevant document segments 610. In an additional embodiment, the context tool 606 provides a revisitation feature. Users can easily return to the original document containing the captured data by simply dragging a data object from the context note-taking area 608 into the browser window 604. Similarly, users can open links saved on the context note-taking area 608 by dragging them to the URL bar of the document browser 602.

FIGS. 7A and 7B show screenshots of the ranked list of relevant document segments and a segment of a document corresponding to the first item on the ranked list, respectively, according to an embodiment of the present invention. In FIG. 7A, a sorted list is provided in an intuitive display showing the degree of relevance for each document unit. Ranked list 702 comprises the recommended sections of a document 708, relevance scores for each section 706, and graphical representations of the relevance scores 704 (e.g., histograms). In an illustrative embodiment, a user may select (e.g., click) any one of the items on the ranked list 702 and the document browser will automatically scroll the displayed document to the corresponding selected section. In FIG. 7B, screenshot 710 corresponds to the recommended section 708 with the highest relevance score 706, "Boston Attractions and Dining." In an alternative embodiment, the corresponding section 710 may be highlighted with a red box or other identifier.

The relevance scores, or values 706, may be calculated using a relevance computation algorithm. As a user browses documents in search of new information related to their task, the context tool automatically employs a relevance algorithm that compares the information stored in the tool's context model with the content of each of the document units extracted from a currently viewed document. The document units are ranked based on the computed degree of relevance and then recommended visually to the user as in FIG. 7A.

Relevance computation is an important part of the context tool's ability to support sensemaking tasks. It assists users in "connecting the dots" by notifying the user about potentially relevant connections between their notes and the fragments of information currently on display within their browser. This feature is especially useful in quickly uncovering either intended or serendipitous connections which a user would otherwise overlook or obtain only by tediously analyzing an entire document.

The relevance metric employed within the context tool is built upon a core function which evaluates the similarity between a single node $n_i$ in the context model and a single document unit $p_j$ taken from a document. This similarity function, noted as $\sigma(n_i, p_j)$, returns a scalar value equal to or greater than zero. A large $\sigma$ value signals a high degree of similarity, while a value of zero indicates the absence of any relationship. The $\sigma$ function is defined in Equation 1 where getContent extracts key terms from a document unit as performed by the content extraction module 324, and S is a measure which compares two content units as will be described below.

$$\sigma(n_i, p_j) = S(\text{Content}\{n_i\}, \text{getContent}\{p_j\}) \tag{1}$$

As mentioned above, the content extraction modules (310 and 324) produce a set of extracted content terms from a data unit (either a document unit or a node in a user's context model). The $S(c_1, c_2)$ metric compares the content of two data units, $c_1$ and $c_2$, by examining all possible pairwise combinations of terms $t_1 \in c_1$ and $t_2 \in c_2$ as defined below in Equation 2, where $\hat{S}$ is pairwise co-occurrence metric.

$$S(c_1, c_2) = \sum_{\forall t_i \in c_1, \forall t_j \in c_2} \hat{S}(t_i, t_j) \tag{2}$$

The current prototype supports two alternative $\hat{S}$ measures: the Jaccard coefficient and the pointwise mutual information. G. Salton et al., "Introduction to Modern Information Retrieval," McGraw-Hill, 1983, and I. Dagan et al., "Contextual word similarity and estimation from sparse data," Computer Speech and Language, Vol. 9, pp. 123-152, 1995, respectively, the disclosures of which are incorporated by reference herein. These metrics are two of the most popular co-occurrence measures used to evaluate the text similarity between terms in the natural language processing and information retrieval communities. J. Jiang et al., "Semantic similarity based on corpus statistics and lexical taxonomy," In Proceedings of the International Conference on Research on Computational Linguistics, 1997; T. Pedersen et al., "Wordnet: similarity-measuring the relatedness of concepts," In Proc. of the National Conf. of AI, 2004; G. Salton, "Automatic Text Processing: the transformation, analysis, and retrieval of information by computer," Addison-Wesley Publishing Company, 1989; and Y. Yang et al., "A comparative study on feature selection in text categorization," In Proceedings of the International Conference on Machine Learning, 1997, the disclosures of which are incorporated by reference herein.

The Jaccard coefficient, noted as $JC(t_1, t_2)$, measures the co-occurrence of two terms, $t_1$ and $t_2$, as defined in Equation 3.

$$JC(t_1, t_2) = \frac{\Theta(t_1 \wedge t_2)}{\Theta(t_1) + \Theta(t_2) - \Theta(t_1 \wedge t_2)} \quad (3)$$

where $\wedge$ denotes the AND operator between terms, and $\Theta$ is a function that returns an estimate of the frequency of occurrence of either a single or pair of terms. In our algorithm, we use the frequency of occurrence as measured by the number of documents which contain a particular term (or pair of terms) according to the YAHOO! search engine. The JC measure is a real function and ranges from zero (no similarity) to one (identity). The value of one indicates that $t_1$ and $t_2$ always appear on the same document and never appear in isolation.

The pointwise mutual information measure, noted as PMI $(t_1, t_2)$, is defined in Equation 4.

$$PMI(t_1, t_2) = \log\frac{\Theta(t_1 \wedge t_2)/M}{[\Theta(t_1)/M][\Theta(t_2)/M]} \quad (4)$$

where M is the total number of documents in the corpus from which the $\Theta$ function determines term frequency. We again use the YAHOO! search engine to estimate the $\Theta$ and manually estimate M to be sufficiently large. The PMI measure is a real function and its value domain is $[0, \infty]$.

Relevance is computed by using the relevance function, $\gamma(C, p_j)$, which measures the similarity between an individual document unit $p_j$ and the user's overall context model C. The $\gamma$ function is built on top of the similarity measure $\sigma(n_i, p_j)$ as defined in Equation 5.

$$g(C, p_j) = \sum_{\forall n_i \in N_C} w(n_i)\sigma(n_i, p_j) \quad (5)$$

where $N_C$ is the set of nodes in C and $\omega(n_i)$ is a weight factor for the contribution of node $n_i$. The $\gamma$ value is a scalar equal to or greater than zero. Larger values for $\gamma$ indicate a higher degree of relevance for the document unit $p_j$.

Conceptually, $\gamma(C, p_j)$ estimates the relevance between C and $p_j$ by summing the similarity between $p_j$ and every node $n_i$ of the context model C weighted by the function $\omega$. In the current implementation we use equal weights where $\omega=1$ for all nodes. In future work, we plan to examine more complex weighting functions (e.g., based on the centrality of individual nodes) to incorporate the structure of the context model into the relevance calculation.

The context tool uses the relevance metric to recommend task-relevant document units to the user. Each time a user visits a new document or alters their notes, the relevance function is iteratively called to calculate the relevance of every document unit $p_j$ from the current document to the current context model C. This produces a list of document units mapped to their affiliated relevance scores. Document units with a score of zero are removed from the list because they correspond to regions of the current document which have been determined to have no relevance to the user's task.

The remaining document units are sorted based on their relevance score and presented to the user within the context tool interface as in FIG. 7A.

Figure 8:
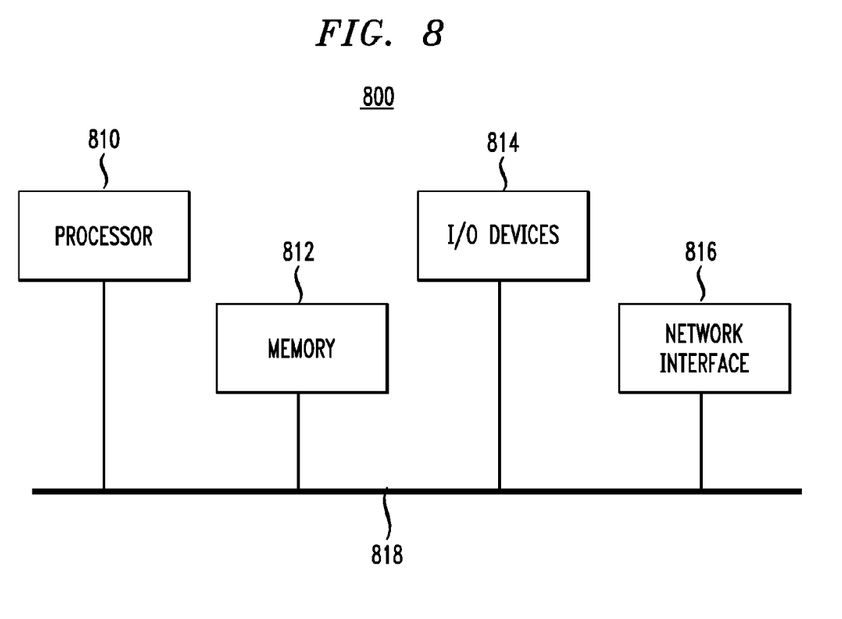
FIG. 8 is a diagram illustrating an illustrative hardware implementation of a computing system in accordance with which one or more components/methodologies of the present invention may be implemented, according to an embodiment of the present invention.

Referring now to FIG. 8, block diagram 800 illustrates an exemplary hardware implementation of a computing system in accordance with which one or more components/methodologies of the invention (e.g., components/methodologies described in the context of FIGS. 1-7) may be implemented, according to an embodiment of the present invention.

As shown, the techniques for locating information in a document relevant to an interest of a user may be implemented in accordance with a processor 810, a memory 812, I/O devices 814, and a network interface 816, coupled via a computer bus 818 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for locating information in a document relevant to an interest of a user, the method comprising:
    collecting information associated with a previous browsing behavior of the user of a document browser;
    generating a context model using the collected information, wherein the context model comprises a data structure defined by a set of nodes and a set of edges wherein each node corresponds to a data unit collected as part of the collected information associated with the previous browsing behavior of the user and each edge corresponds to a user-created association between nodes;
    obtaining a document selected by the user via the document browser in a current browsing behavior;
    dividing the selected document associated with the current browsing behavior into one or more segments;

computing a relevance value for each of the one or more segments of the selected document associated with the current browsing behavior by comparing each of the one or more segments to the context model generated from the collected information associated with the previous browsing behavior, wherein the relevance value represents a relationship to an interest of the user and wherein the comparison comprises evaluating a similarity function between one or more of the nodes of the context model and the one or more segments of the selected document; and presenting each of the one or more segments with the computed relevance value in a defined organizational area of a display, wherein the one or more segments presented on the display are linked to a corresponding one or more segments in the selected document and assist the user in a resolution of a connection discovery task associated with the previous and current browsing behaviors.

2. The method of claim 1, wherein the information defined by the user comprises at least one of a portion of text from a previously viewed document, an image from a previously viewed document, a web address, and a note inputted by the user.

3. The method of claim 1, wherein the context model comprises at least one of inferred information about an interest of the user and explicit information from the user.

4. The method of claim 1, wherein the context model is updated when additional information is collected.

5. The method of claim 4, wherein the relevance value for each of the one or more segments is re-evaluated when the context model is updated.

6. The method of claim 1, wherein the one or more edges define an organizational structure of the one or more nodes.

7. The method of claim 1, wherein each of the one or more nodes represent at least one item of the collected information.

8. The method of claim 7, wherein each of the one or more nodes comprise at least one of a data type of the at least one item, a node identifier, raw data of the at least one item, and a set of key data extracted from the raw data of the at least one item.

9. The method of claim 1, wherein the similarity is calculated using at least one of a Jaccard Coefficient equation and a Pointwise Mutual Information equation.

10. The method of claim 1, wherein the relevance value is the sum of the calculated similarities.

11. The method of claim 10, wherein the sum of the calculated similarities is in accordance with a weight assigned to each of the calculated similarities.

12. The method of claim 1, wherein the document is divided in accordance with at least one of structural tags of the document and text of the document.

13. The method of claim 1, wherein the one or more segments are presented in at least one of an order of relevance, an alphabetical order, and an order of appearance in the document.

14. The method of claim 1, wherein the relevance value is presented as at least one of a histogram and a numeral.

15. The method of claim 1, further comprising the steps of:
navigating to the one or more segments in the document in accordance with a user request to view a given segment; and
marking the one or more segments in the document by at least one of a highlight, a zoom-in, a thumbnail, and a popup window.

16. The method of claim 15, wherein navigating comprises at least one of scrolling and paging to the one or more segments in the document.

17. An article of manufacture for locating information in a document relevant to an interest of a user, the article comprising a computer readable storage medium including one or more programs, which when executed by a computer implement steps of
collecting information associated with a previous browsing behavior of the user of a document browser;
generating a context model using the collected information, wherein the context model comprises a data structure defined by a set of nodes and a set of edges wherein each node corresponds to a data unit collected as part of the collected information associated with the previous browsing behavior of the user and each edge corresponds to a user-created association between nodes;
obtaining a document selected by the user via the document browser in a current browsing behavior;
dividing the selected document associated with the current browsing behavior into one or more segments;
computing a relevance value for each of the one or more segments of the selected document associated with the current browsing behavior by comparing each of the one or more segments to the context model generated from the collected information associated with the previous browsing behavior, wherein the relevance value represents a relationship to an interest of the user and wherein the comparison comprises evaluating a similarity function between one or more of the nodes of the context model and the one or more segments of the selected document; and
presenting each of the one or more segments with the computed relevance value in a defined organizational area of a display, wherein the one or more segments presented on the display are linked to a corresponding one or more segments in the selected document and assist the user in a resolution of a connection discovery task associated with the previous and current browsing behaviors.

18. An apparatus for locating information in a document relevant to an interest of a user, the apparatus comprising:
a memory; and
at least one processor coupled to the memory and operative to: collect information associated with a previous browsing behavior of the user of a document browser; generate a context model using the collected information, wherein the context model comprises a data structure defined by a set of nodes and a set of edges wherein each node corresponds to a data unit collected as part of the collected information associated with the previous browsing behavior of the user and each edge corresponds to a user-created association between nodes; obtain a document selected by the user via the document browser in a current browsing behavior; divide the selected document associated with the current browsing behavior into one or more segments; compute a relevance value for each of the one or more segments of the selected document associated with the current browsing behavior by comparing each of the one or more segments to the context model generated from the collected information associated with the previous browsing behavior, wherein the relevance value represents a relationship to an interest of the user and wherein the comparison comprises evaluating a similarity function between one or more of the nodes of the context model and the one or more segments of the selected document; and present each of the one or more segments with the computed relevance value in a defined organizational area of a display, wherein the one or more segments presented on the display are linked to a corresponding one or more segments in the selected document and assist the user in a resolution of a connection discovery task associated with the previous and current browsing behaviors.

19. The apparatus of claim 18, wherein the information defined by the user comprises at least one of a portion of text from a previously viewed document, an image from a previously viewed document, a web address, and a note inputted by the user.

20. The apparatus of claim 18, wherein the at least one processor is further operative to: (i) navigate to the one or more segments in the document in accordance with a user request to view a given segment; and (ii) mark the one or more segments in the document by at least one of a highlight, a zoom-in, a thumbnail, and a popup window.

21. A system for locating information in a document relevant to an interest of a user, the system comprising:
- a context tool interface for collecting information associated with a previous browsing behavior of the user of a document browser;
- a context model update module for generating a context model using the collected information, wherein the context model comprises a data structure defined by a set of nodes and a set of edges wherein each node corresponds to a data unit collected as part of the collected information associated with the previous browsing behavior of the user and each edge corresponds to a user-created association between nodes;
- a document browser interface for obtaining a document selected by the user in a current browsing behavior;
- a document segmentation module for dividing the selected document associated with the current browsing behavior into one or more segments;
- a relevance computation module for computing a relevance value for each of the one or more segments of the selected document associated with the current browsing behavior by comparing each of the one or more segments to the context model generated from the collected information associated with the previous browsing behavior, wherein the relevance value represents a relationship to an interest of the user and wherein the comparison comprises evaluating a similarity function between one or more of the nodes of the context model and the one or more segments of the selected document; and
- a display for presenting each of the one or more segments with the computed relevance value in a defined organizational area, wherein the one or more presented segments are linked to a corresponding one or more segments in the selected document and assist the user in a resolution of a connection discovery task associated with the previous and current browsing behaviors.

* * * * *